A. W. FRENCH.
COOKER FOR OIL BEARING MATERIAL AND THE LIKE.
APPLICATION FILED FEB. 16, 1912.
1,153,212.
Patented Sept. 14, 1915.
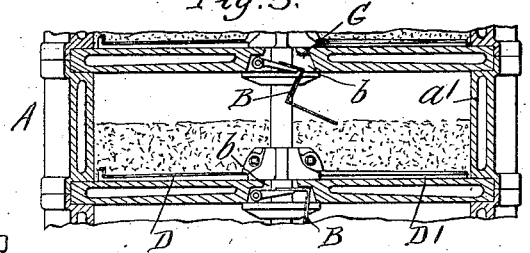
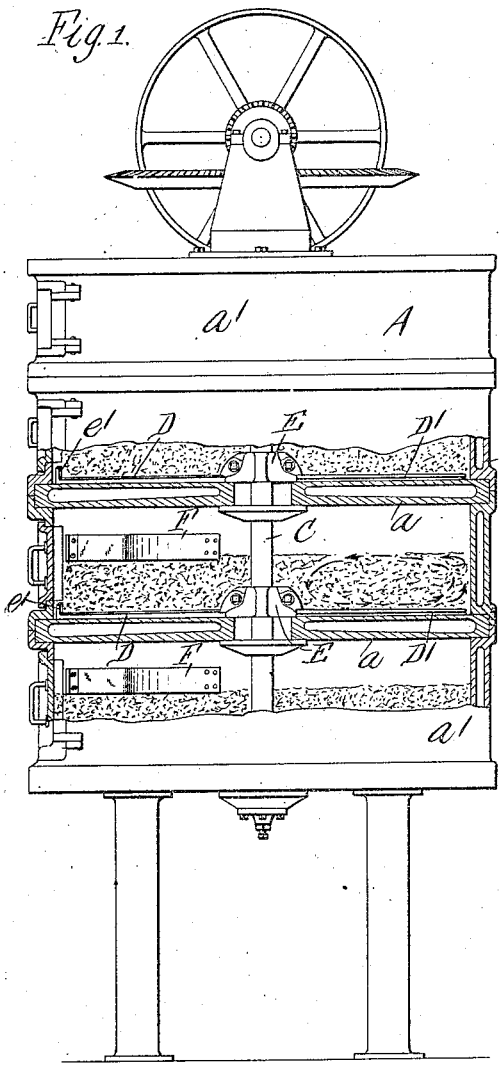
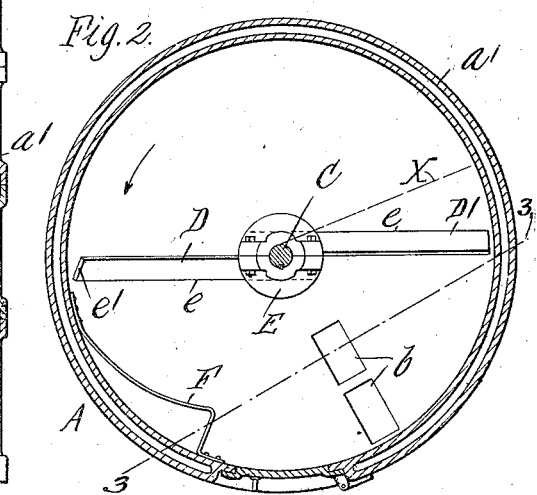

UNITED STATES PATENT OFFICE.

ALFRED W. FRENCH, OF PIQUA, OHIO.

COOKER FOR OIL-BEARING MATERIAL AND THE LIKE.

1,153,212.   Specification of Letters Patent.   Patented Sept. 14, 1915.

Application filed February 16, 1912. Serial No. 678,115.

*To all whom it may concern:*

Be it known that I, ALFRED W. FRENCH, a citizen of the United States, residing at Piqua, in the county of Miami and State of Ohio, have invented a new and useful Improvement in Cookers for Oil-Bearing Material and the like, of which the following is a specification.

This invention relates to steam cookers or heaters of that kind which are used for heating oil bearing meals or material preparatory to expressing the oil therefrom, and particularly to cookers in which the discharge of material from one chamber to the next is controlled by a downwardly opening gate.

The object of the invention is to provide a desirable and practical construction whereby the gate has ample room to swing fully open without interference by the traveling stirrers for the material, even in shallow chambers, and whereby the material is prevented from clogging or being retained in the gate openings so as to be overheated or scorched.

In the accompanying drawings: Figure 1 is an elevation partly in section of a steam cooker embodying the invention. Fig. 2 is a sectional plan thereof. Fig. 3 is a section of one of the heating chambers in line 3—3, Fig. 2.

Like reference characters refer to like parts in the several figures.

A represents a steam cooker or heater which, in the construction illustrated, comprises a series of heating chambers arranged one over and upon the other, each chamber having the usual hollow bottom and side walls $a$ and $a'$ to which steam is supplied for heating the material. Each chamber has a bottom discharge opening $b$, shown in Figs. 2 and 3, controlled by a gate B. This invention is not, however, concerned with the construction and arrangement of the heating chambers and except as hereinafter described the usual or any suitable construction can be employed.

The cooker is provided with a stirrer which, as shown, consists of a rotary shaft C extending centrally through the cooker and provided with arms or sweeps D D' which project therefrom in the bottom portion of each chamber. The sweeps shown are straight and are secured to a hub E on the shaft C at opposite sides of a diameter of the hub, so that the leading edge of each sweep extends obliquely rearward from the radial with reference to the direction of rotation of the stirrer, as indicated by the broken radial line X and the arrow in Fig. 2. As a consequence of this arrangement, the leading edges $e$ of the sweeps engage the material at such an angle that the material is moved around in the chamber in the direction of movement of the sweeps and in addition is gradually shoved outwardly toward the circular wall of the heating chamber. The outer end of one of the sweeps extends upwardly beside the circular wall of the heating chamber as indicated at $e'$, and causes an upward movement of the material adjacent to the circular wall of the chamber.

F represents a deflecting plate or bar secured to the circular wall of each heating chamber above the sweeps and extending eccentrically inward therefrom for deflecting the material inwardly away from said wall.

The cooker shown in the drawings is of that kind in which the material discharges by gravity more or less continuously from one chamber to the next one below and the gate B of one chamber is adapted to be closed by a part or device which floats or rides on the material accumulating in the next lower chamber, so as to automatically close the gate and regulate the quantity of material in each chamber and the length of time required for the material to pass through the several chambers of the cooker. As the level of the rotating body of material in one chamber rises or falls it causes the gate for the next chamber above to correspondingly close or open. In these cookers, as heretofore constructed, the discharge opening gradually increases in width downwardly to prevent the clogging of the material in the opening, and the gate is hinged on the underside of the hollow bottom of the chamber. In very shallow chambers, this arrangement does not afford room enough to allow the automatic gate to swing downwardly without coming in contact with the revolving sweeps D D' when the chamber is emptied, and the sweeps knock the end of the gate at each revolution. Also a certain amount of material is apt to be held by the gate in the deep opening between the upper and under sides of the hollow bottom of the chamber, and to become scorched from the heat of the bottom. By undercutting the discharge opening in the chamber bottom, as shown at G in Fig. 3, and hinging the gate in this enlarged lower portion of the opening, these objections are overcome. The gate has ample room to swing fully open without contact with the sweeps, even in very shallow chambers, and the material will not clog in the opening, so as to be retained therein and overheated.

This invention is not restricted to the construction of the stirring means described above, such construction being only one of many which could be employed in connection with the invention.

I claim as my invention:

1. The combination of a plurality of heating chambers an upper one of which is provided with a hollow bottom to which steam is supplied for heating the material, and which has an opening through which the material discharges to the next chamber below, the discharge opening of such upper chamber being undercut, and a gate which is hinged in the enlarged portion of the discharge opening and is adapted to ride on the material in the lower chamber for controlling the discharge of the material from the upper chamber, substantially as set forth.

2. The combination of a plurality of heating chambers an upper one of which is provided with means for heating the material and which has an opening in its bottom through which the material discharges to the next chamber below, the discharge opening of such upper chamber being undercut, a hinged gate which is located in the enlarged portion of said discharge opening, and means adapted to ride on the material in the lower chamber and operatively connected with said gate for controlling the discharge of the material from the upper chamber, substantially as set forth.

Witness my hand this 12th day of Feby., 1912.

ALFRED W. FRENCH.

Witnesses:
C. B. JAMISON,
C. B. TIPTON.